United States Patent [19]

Junya

[11] Patent Number: 5,469,564
[45] Date of Patent: Nov. 21, 1995

[54] DATA STORAGE DEVICE WITH ENHANCED DATA SECURITY

[75] Inventor: Tempaku Junya, Tokyo, Japan

[73] Assignee: Samsung Electronics Co., Ltd., Suwon, Rep. of Korea

[21] Appl. No.: 181,077

[22] Filed: Jan. 13, 1994

[30] Foreign Application Priority Data

Feb. 8, 1993 [JP] Japan .................. 5-020155

[51] Int. Cl.$^6$ .................................. G06F 11/34
[52] U.S. Cl. .................. 395/188.01; 380/4; 395/491
[58] Field of Search .................. 371/2.2; 395/575, 395/425; 364/246.6, 246.8; 380/4

[56] References Cited

U.S. PATENT DOCUMENTS

| | | | |
|---|---|---|---|
| 4,815,032 | 3/1989 | Fujii | 364/900 |
| 4,879,747 | 11/1989 | Leighton et al. | 380/23 |
| 4,882,474 | 11/1989 | Anderl et al. | 235/380 |
| 4,947,318 | 8/1990 | Mineo | 364/200 |
| 5,034,597 | 7/1991 | Atsumi et al. | 235/380 |
| 5,206,905 | 4/1993 | Lee et al. | 380/4 |
| 5,226,137 | 7/1993 | Bolan et al. | 395/425 |
| 5,274,754 | 12/1993 | Boerbert | 380/25 |
| 5,274,824 | 12/1993 | Howarth | 395/725 |
| 5,289,540 | 2/1994 | Jones | 380/4 |

Primary Examiner—Robert W. Beausoliel, Jr.
Assistant Examiner—Albert Decady
Attorney, Agent, or Firm—Robert A. Westerlund; Stephen R. Whitt; Charles R. Donohue

[57] ABSTRACT

A data storage device having the capability of preventing unauthorized access to data stored therein, including a memory, e.g., a flash EEPROM, having a first portion for storing a plurality of internal passwords and a second portion for storing address data, e.g., encoded password addresses and status identification data, indicating the location of the internal passwords in the first portion, a control circuit responsive to an access request signal from an external device, e.g., a host computer, for reading the internal passwords from the first portion of the memory in accordance with the address data stored in the second portion of said memory, a comparison circuit coupled to the control circuit for comparing the internal passwords read from the first portion of the memory with external passwords received from the external device and for generating a comparison output signal indicative of whether respective ones of the internal and external passwords match and, an access permission signal generating circuit responsive to the comparison output signal for generating an access permission signal having first and second logic levels indicative of whether the external device is permitted or denied access to the data stored in the data storage device, respectively.

18 Claims, 2 Drawing Sheets

DATA STORAGE DEVICE WITH ENHANCED DATA SECURITY

FIELD OF THE INVENTION

The present invention relates generally to data storage devices, and more particularly, to a data storage device capable of providing improved protection against unauthorized access to secret or confidential information stored therein.

BACKGROUND OF THE INVENTION

Various techniques have been proposed for protecting against unauthorized access to secret or private information stored in data storage devices. The two most prevalent techniques can be broadly characterized as hardware write protection and software write protection. Hardware write protection generally involves the use of a write protection clock. Software write protection is generally implemented by means of a directory which includes a list of the files to which access is not permitted without special permission, and the files which are permitted to be altered or updated.

A primary shortcoming of the presently available data protection schemes is that they do not effectively prevent an unauthorized person from reading out the secret files. For example, although most computers are programmed to permit access only to persons who input a valid password, this security measure is, in reality, too easily defeated. Other systems only provide a warning or cautionary message when unauthorized accesses are made.

Based on the above, it can be appreciated that there presently exists a need for a data storage device which eliminates the above-described drawbacks and shortcomings of the presently available data storage devices. The present invention fulfills this need.

SUMMARY OF THE INVENTION

The present invention encompasses a data storage device having the capability of preventing unauthorized access to data stored therein, including a memory, e.g., a flash EEPROM, having a first portion for storing a plurality of internal passwords and a second portion for storing address data, e.g., encoded password addresses and status identification data, indicating the location of the internal passwords in the first portion, a control circuit responsive to an access request signal from an external device, e.g., a host computer, for reading the internal passwords from the first portion of the memory in accordance with the address data stored in the second portion of said memory, a comparison circuit coupled to the control circuit for comparing the internal passwords read from the first portion of the memory with external passwords received from the external device and for generating a comparison output signal indicative of whether respective ones of the internal and external passwords match and, an access permission signal generating circuit responsive to the comparison output signal for generating an access permission signal having first and second logic levels indicative of whether the external device is permitted or denied access to the data stored in the data storage device, respectively.

BRIEF DESCRIPTION OF THE DRAWINGS

These and various other features and advantages of the present invention will be readily understood with reference to the following detailed description taken in conjunction with the accompanying drawings, wherein like reference numerals designate like structural elements, and, in which.

DETAILED DESCRIPTION OF THE INVENTION

Figure 1:
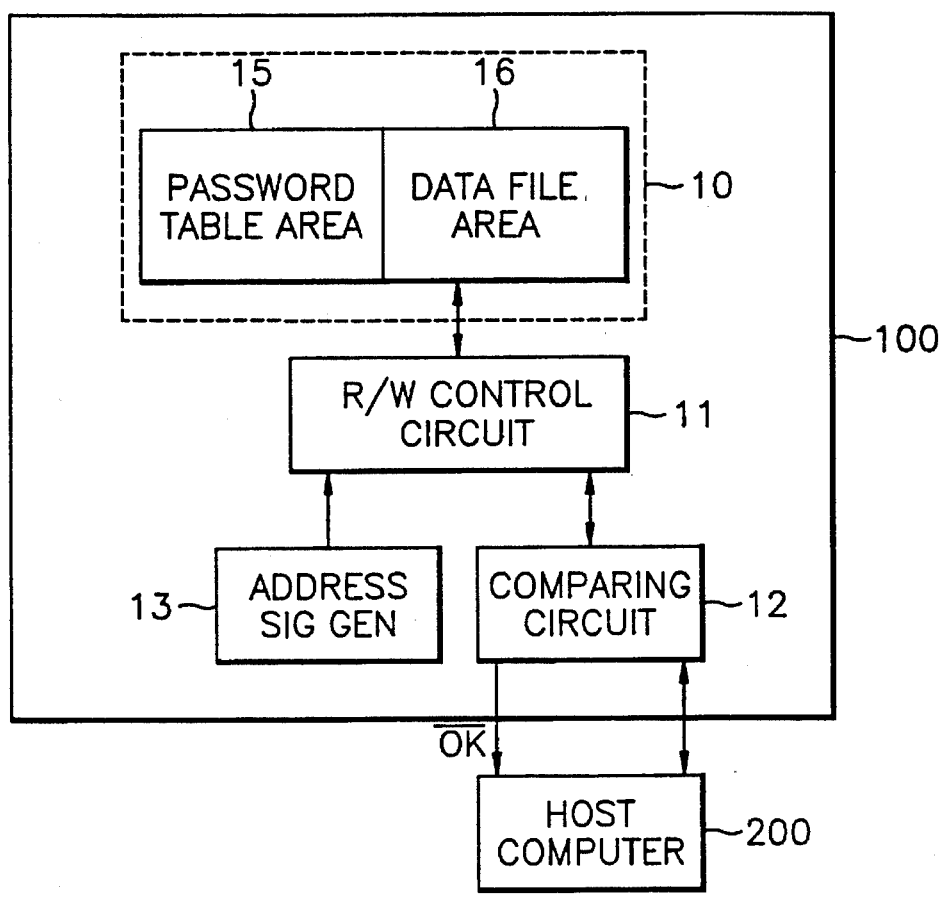
FIG. 1 is a functional block diagram of a data storage device constructed in accordance with a preferred embodiment of the present invention.

With reference now to FIG. 1, there can be seen a block diagram of a data storage device 100 constructed in accordance with a preferred embodiment of the present invention. The data storage device 100 includes a memory 10 having a password table area 15 and a data file area 16. The memory 10 is preferably a flash EEPROM, although the type of memory employed is not limiting to the present invention. The data storage device 100 further includes a read/write control circuit 11 for controlling read/write operations, i.e., reading data from the memory 10 and writing data into the memory 10. The data storage device 100 also includes an address signal generator 13 and a comparing circuit 12. Additionally, the data storage device 100 is depicted in FIG. 1 as being interfaced with a host computer 200.

Passwords, e.g., those designated by an authorized user, are stored in the data file area 16 of the memory 10. The addresses of the passwords stored in the data file area 16 are stored in the password table area 15 of the memory 10. The read/write control circuit 11 functions to read passwords from the data file area 16 of the memory 10 in response to address signals generated by the address signal generator 13 based upon the password addresses read from the password table area 15. The comparing circuit 12 functions to compare the passwords read out by the read/write control circuit 11 with the password supplied by the host computer 200. If the comparing circuit 12 detects a match, the data storage device 100 provides an access permission signal, e.g., a/OK signal, to the host computer 200.

Figure 2:
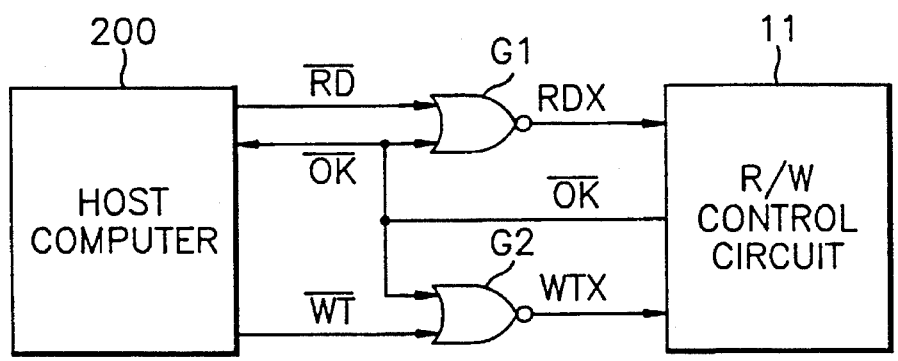
FIG. 2 is a partial schematic, block diagram illustrating a preferred embodiment of the interface between the data storage device depicted in FIG. 1 and a host computer.

With reference now to FIG. 2, there can be seen a preferred embodiment of circuitry for interfacing the read/write (R/VV) control circuit 11 of the data storage device 100 with the host computer 200. In operation, the host computer 200 generates a read request signal/RD and a write request signal/VVT, which are applied as first inputs to respective NOR gates G1 and G2. The access permission signal/OK produced by the data storage device 100 is applied as a second input to both of the NOR gates G1 and G2. Thus, when the access permission signal/OK is at a logic "low" level, read and write operations are enabled. More particularly, if the read request signal/RD is at a logic "low" level, indicating that a read operation has been requested by the host computer 200, the output RDX (read control signal) of the NOR gate G1 will be driven high. Similarly, if the write request signal/VVT is at a logic "low" level, indicating that a write operation has been requested by the host computer 200, the output WTX (write control signal) of the NOR gate G2 will be driven high. When the read control signal RDX is at a logic "low" level, the host computer 200 is inhibited from reading data from the data storage device 100. Similarly, when the write control signal WTX is at a logic "low" level, the host computer 200 is inhibited from writing data into the data storage device 100.

Figure 3:
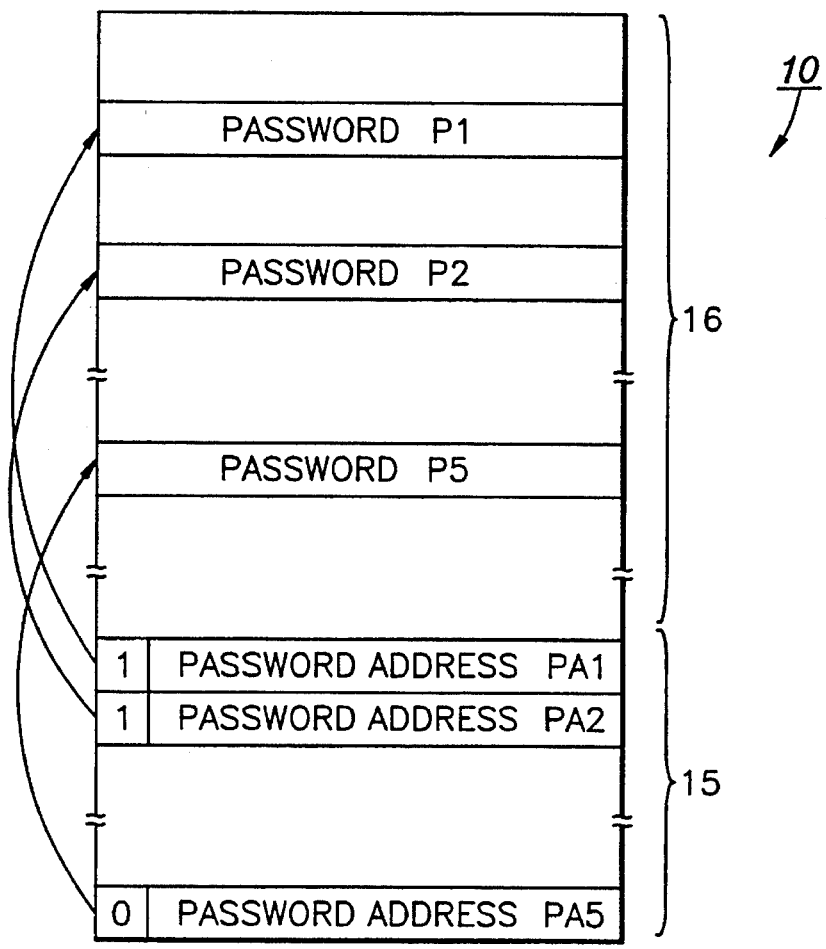
FIG. 3 is a block diagram illustrating the organization of the memory of the data storage device depicted in FIG. 1; and, FIG. 4 is a partial schematic, block diagram illustrating the data access control circuitry of the data storage device depicted in FIG. 1.

With reference now to FIG. 3, the organization of the memory 10 is illustrated in conjunction with an exemplary embodiment of the present invention, wherein five passwords P1–P5 are stored in the data file area 16, and five corresponding password addresses PA1–PA5 are stored in the password table area 15. Of course, the number and type of passwords employed is not limiting to the present invention. In accordance with the preferred embodiment of the present invention, however, an additional bit is added to the password addresses to indicate whether the corresponding passwords are in use (active) or not. For example, if a particular password Pi is active, then the initial bit of the corresponding password address PA1 will be a "1"; otherwise, it will be a "0". The remaining portion of each password address field constitutes the actual address of the corresponding password in the data file area 16.

In operation, when the host computer 200 issues a read or write request (i.e., a data access request), the active password addresses (which are preferably encoded) are read from the password table area 15 of the memory 10 by the read/write control circuit 11 and supplied to the address signal generator 13, which functions to decode the active password addresses (if they are encoded) and to generate the absolute or actual active password addresses, which are then applied to the read/write control circuit 11. The read/write control circuit 11 then reads out the active passwords from the data file area 16 located at the addresses indicated by the actual active password addresses.

In the preferred embodiment of the present invention, when an error check circuit (not shown) of the data storage device 100 detects an error in a password address read out from the password table area 15 of the memory 10, the password address is replaced by prescribed data, e.g., "FFFF", to indicate its unreliability.

In the preferred embodiment of the present invention, the number of passwords used is an odd number, e.g., five, in order to enable the accuracy of the passwords to be determined by a majority rule in the event that one or more of the five passwords read from the memory 10 are incorrect.

Figure 4:
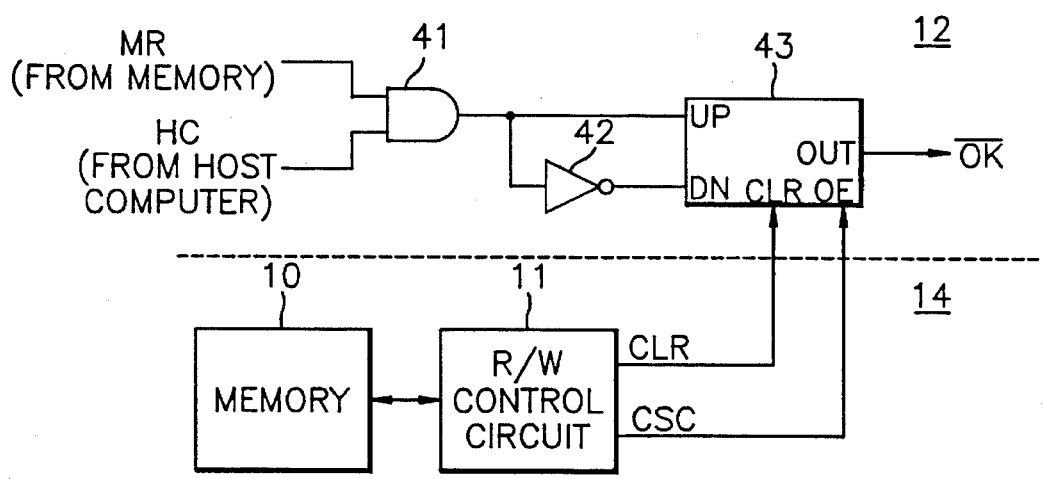

With reference now to FIG. 4, there can be seen a preferred embodiment of the comparing circuit 12 and a control portion 14 of the data storage device 100 which includes the R/W control circuit 11. The comparing circuit includes a digital comparator 41, an inverter 42 and an up/down counter 43. The digital comparator 41 compares a password HC received from the host computer 200 with a password MR read from the memory 10. If the password HC matches the password MR (i.e., a coincidence is detected), then the output of the comparator 41 is driven high. If the password HC does not match the password MR (i.e., if an incoincidence is detected), then the output of the comparator 41 is driven low. The output of the comparator 41 is applied to the up-counting terminal (UP) of the up/down counter 43. The output of the comparator 41 is also inverted by the inverter 42, and the thusly inverted output of the comparator 41 is applied to the down-counting terminal (DN) of the up/down counter 43.

Thus, in operation, the up/down counter 43 is incremented in response to the detection of a match between the password HC and the password MR, and decremented in response to the detection of no match between the password HC and the password MR. The read/write control circuit 11 detects the initial bit of the respective password addresses PA1-PA5 to determine which of the passwords MR are inactive. After all password addresses PA1-PA5 have been thusly verified, the read/write control circuit 11 generates a counting stop control signal CSC which is applied to an output enable (OE) terminal of the up/down counter 43. In response to receipt of a "high" logic level CSC signal, the final count value of the up/down counter 43 is determined. If a majority of the five passwords MR read from the memory 10 match the passwords HC received from the host computer 200 (i.e., if three or matches are detected by the comparator 41), the up/down counter 43 generates an access permission signal/OK having a "low" logic level, to thereby permit the host computer 200 to access the corresponding data file. If a new password HC is received from the host computer 200 before the up/down counter 43 starts counting, the control circuit 11 generates a clear signal CLR to the CLR terminal of the up/down counter 43, thereby clearing the up/down counter 43.

Although the present invention has been described hereinabove in terms of a single memory 10 having a password table area 15 and a data file area 16, it should be clearly understood that a separate memory could alternatively be utilized for the password table area 15 and the data file area 16, respectively. Also, rather than the passwords being stored in separate memory blocks of a flash EEPROM, alternatively, all of the passwords could be stored in the same memory block. Further, although the starting addresses stored in the password table area 15 are fixed so as to prevent the host computer 200 from accessing them, alternatively, the starting addresses stored in the password table area 15 could be stored in a directory contained in the host computer 200. More generally, although the present invention has been described in detail hereinabove in conjunction with a specific preferred embodiment thereof, it should be clearly understood than many variations and/or modifications of the basic inventive concepts herein taught which may appear to those skilled in the art will still fall within the spirit and scope of the present invention as defined in the appended claims.

What is claimed is:

1. A data storage device having a feature for preventing unauthorized access to data stored therein, comprising:

memory means having a first portion for storing an internal password and a second portion for storing address data indicating the location of said internal password in said first portion;

a control circuit responsive to an access request signal from an external device for reading said internal password from said first portion of said memory means in accordance with said address data stored in said second portion of said memory means;

a comparison circuit coupled to said control circuit for comparing said internal password read from said first portion of said memory means with an external password received from said external device and for generating a comparison output signal indicative of whether or not said internal and external passwords match;

an access permission signal generating circuit responsive to said comparison output signal for generating an access permission signal having first and second logic levels indicative of whether said external device is permitted or denied access to said data stored in said data storage device, respectively; and, an interface circuit for interfacing said external device and said data storage device, said interface circuit including a first NOR gate having first and second input terminals, said first input terminal receiving a read request signal from said external device and said second input terminal receiving said access permission signal, and a second NOR gate having first and second input terminals, said first input terminal receiving a write request signal from said external device and said second input terminal receiving said access permission signal.

2. The device as set forth in claim 1, wherein said address data is encoded and said control circuit includes an address signal generating circuit for decoding said address data and for generating the actual address of said internal password in said first portion of said memory means.

3. The device as set forth in claim 2, wherein said memory means comprises a flash EEPROM.

4. The device as set forth in claim 1, wherein said first portion of said memory means comprises a first memory device and said second portion of said memory means comprises a second memory device.

5. The device as set forth in claim 2, wherein said first portion of said memory means comprises a first memory device and said second portion of said memory means comprises a second memory device.

6. The device as set forth in claim 1, wherein said access permission signal is at a first logic level when said comparison output signal indicates that said internal and external passwords match, and at a second logic level when said comparison output signal indicates that said internal and external passwords do not match, and wherein further, said first logic level indicates that access to said data stored in said data storage device is permitted, and said second logic level indicates that access to said data stored in said data storage device is denied.

7. A data storage device having a feature for preventing unauthorized access to data stored therein, comprising:

memory means having a first portion for storing a plurality of internal passwords and a second portion for storing address data indicating the location of said internal passwords in said first portion;

a control circuit responsive to an access request signal from an external device for reading said internal passwords from said first portion of said memory means in accordance with said address data stored in said second portion of said memory means;

a comparison circuit coupled to said control circuit for comparing said internal passwords read from said first portion of said memory means with an external passwords received from said external device and for generating a comparison output signal indicative of whether or not said internal and external passwords match;

an access permission signal generating circuit responsive to said comparison output signal for generating an access permission signal having first and second logic levels indicative of whether said external device is permitted or denied access to said data stored in said data storage device, respectively; and, an interface circuit for interfacing said external device and said date storage device, said interface circuit including a first NOR gate having first and second input terminals, said first input terminal receiving a read request signal from said external device and said second input terminal receiving said access permission signal, and a second NOR gate having first and second input terminals, said first input terminal receiving a write request signal from said external device and said second input terminal receiving said access permission signal.

8. The device as set forth in claim 7, wherein said address data is encoded and said control circuit includes an address signal generating circuit for decoding said address data and for generating the actual addresses of said internal passwords in said first portion of said memory means.

9. The device as set forth in claim 7, wherein said memory means comprises a flash EEPROM.

10. The device as set forth in claim 7, wherein said first portion of said memory means comprises a first memory device and said second portion of said memory means comprises a second memory device.

11. The device as set forth in claim 7, further comprising an inverter coupled to said comparison output signal for producing an inverted comparison output signal, and wherein said access permission signal is at a first logic level when said comparison output signal indicates that respective ones of said internal and external passwords match, and at a second logic level when said comparison output signal indicates that respective ones of said internal and external passwords do not match.

12. The device as set forth in claim 11, wherein said access permission signal generating circuit includes an up/down counter having an up-counting terminal coupled to said comparison output signal and a down-counting terminal coupled to said inverted comparison output signal, said up/down counter being incremented each time said comparison output signal is driven to said first logic level and decremented each time said comparison output signal is driven to said second logic level, wherein said up/down counter generates an access permission signal of said first logic level when the total number of matches between said internal and external passwords exceeds the total number of no matches between said internal and external passwords.

13. The device as set forth in claim 12, wherein said address data includes a plurality of password addresses corresponding to respective ones of said internal passwords, and wherein further, each of said password addresses includes an additional bit indicative of whether or not its corresponding internal password is active or inactive.

14. The device as set forth in claim 13, wherein said control circuit is responsive to said additional bits in said password addresses to determine which of said internal passwords are active.

15. The device as set forth in claim 13, wherein said address data is encoded, and further comprising an address signal generating circuit coupled to said control circuit for decoding said password addresses and for generating the actual password addresses of said active internal passwords in said first portion of said memory means.

16. The device as set forth in claim 15, wherein said control circuit only supplies said password addresses corresponding to active passwords to said address signal generating circuit.

17. The device as set forth in claim 14, wherein said control circuit generates a counting stop control signal after verifying the active/inactive status of all of said internal passwords, and wherein further, said up/down counter further includes an output enable terminal for receiving said counting stop control signal, said up/down counter being responsive to said counting stop control signal for discontinuing any further counting and for generating said access permission signal.

18. The device as set forth in claim 17, further comprising an interface circuit for interfacing said external device and said data storage device, said interface circuit including:

a first NOR gate having first and second input terminals, said first input terminal receiving a read request signal from said external device and said second input terminal receiving said access permission signal; and, a second NOR gate having first and second input terminals, said first input terminal receiving a write request signal from said external device and said second input terminal receiving said access permission signal.

* * * * *